F. W. REED.
PIPE COUPLING.
APPLICATION FILED JUNE 1, 1909.
964,315.
Patented July 12, 1910.
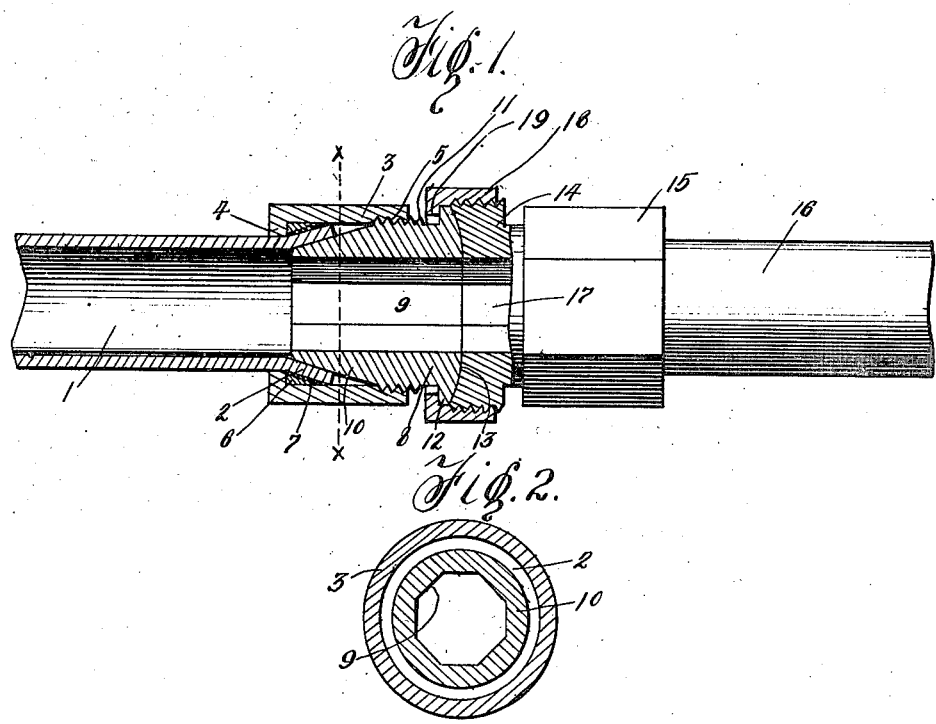

UNITED STATES PATENT OFFICE.

FREDERICK W. REED, OF TRAFFORD, PENNSYLVANIA.

PIPE-COUPLING.

964,315.   Specification of Letters Patent.   Patented July 12, 1910.

Application filed June 1, 1909. Serial No. 499,285.

*To all whom it may concern:*

Be it known that I, FREDERICK W. REED, a citizen of the United States of America, residing at Trafford city, in the county of Westmoreland and State of Pennsylvania, have invented certain new and useful Improvements in Pipe-Couplings, of which the following is a specification, reference being had therein to the accompanying drawing.

This invention relates to pipe couplings, and the invention has for its object the provision of simple and effective means for connecting a wrought iron pipe to a lead pipe, without the use of solder or a similar material.

Another object of the invention is to facilitate the work of a plumber in connecting lead or soft metal pipes to various structures, for instance, the down pipe of a basin or bowl.

With the above and other objects in view, which will more readily appear as the invention is better understood, the same consists in the novel construction, combination and arrangement of parts to be presently described and then claimed.

In the drawings, Figure 1 is a longitudinal sectional view of a pipe coupling constructed in accordance with my invention, Fig. 2 is a cross sectional view of the same taken on the line X—X of Fig. 1.

In the drawings 1 denotes a piece of lead pipe having a flared end 2. Surrounding the flared end 2 is a sleeve 3 having one end thereof provided with an inwardly projecting annular flange 4, while the opposite end is interiorly screw threaded, as at 5.

6 designates an annular holder triangular in cross section with the hypotenuse surface thereof serrated or roughened, as at 7, to engage the outer sides of the flared end 2 of the lead pipe 1, said holder being located within the sleeve 3 against the inwardly projected annular flange 4 thereof.

8 designates a coupling member having a longitudinal octagon shaped bore 9. The coupling member 8 is provided with a tapering end 10 adapted to fit in the flared end of the pipe 1 and hold the flared end thereof in engagement with the holder 6. The coupling member 8 is exteriorly screw threaded, as at 11, to screw in the sleeve 3, and the end thereof, opposite the tapered end 10, is provided with a peripheral flange 12 and rounded, as at 13.

14 designates an exteriorly screw threaded follower having one end thereof dished or concave, to receive the rounded end 13 of the member 8, while the opposite end of the follower is connected by a union 15 to a wrought iron pipe 16. The follower 14 is provided with an octagon shaped bore 17 adapted to register with the bore 9 of the member 8 and permit of a wrench or suitable instrument (not shown), being inserted in the bores 9 and 17 for rotating the member 8 and the follower 14.

18 designates a nut interiorly screw threaded to receive the follower 14, said nut having an inwardly projecting flange 19 to bear against the peripheral flange 12 of the member 8 and retain said member in engagement with the follower 14.

Having now described my invention, what I claim as new, is—

In a pipe coupling, the combination with a pair of pipe sections, one of said sections having a flared end, of a flanged sleeve having its flange seated upon the flared pipe section inwardly of the flared end and provided with interior threads, an annular holder arranged within and abutting against the flanged end of said sleeve and having a beveled and serrated inner face engaging the outer face of the said flared end, a coupling member having a peripherally-threaded cylindrical body portion engaging the threads of said sleeve whereby the sleeve and said member are connected together, said member further provided with a beveled extension projecting from the body portion and engaging the inner face of said flared end whereby said flared end is held against the serrated face of the holder and said holder wedged against the inner face of the sleeve, said coupling member further provided with a peripheral flange at the terminus of the body portion, that terminus of the body portion which is provided with a flange being rounded, the threads of said body portion terminating at a point removed from the flange of the body portion, a peripherally threaded follower provided with a concave terminus receiving the rounded terminus of said coupling member, an interiorly threaded flanged nut engaging the threads of said follower and overlapping the flange of said coupling member whereby said member and follower are connected together, and a union for connecting the follower to the other pipe section.

In testimony whereof I affix my signature in the presence of two witnesses.

FREDERICK W. REED.

Witnesses:
F. M. McBRIDE,
CHARLES BOLAM.